Feb. 14, 1956 H. C. ERLING 2,734,437
CARRIAGE LIFT FOR DISC PLOWS
Filed Feb. 14, 1950 2 Sheets-Sheet 2
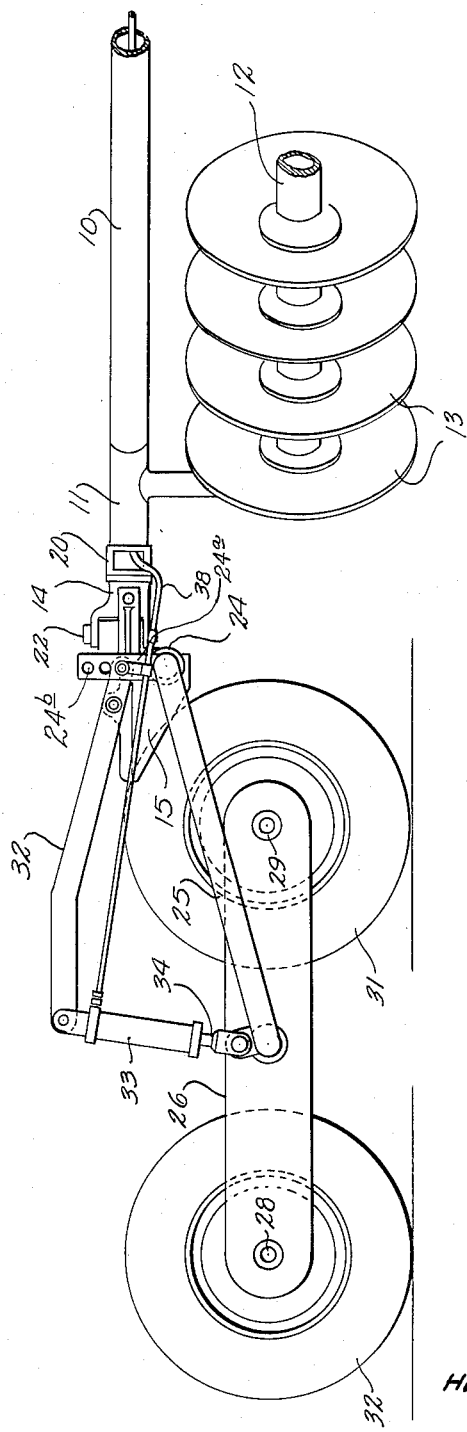
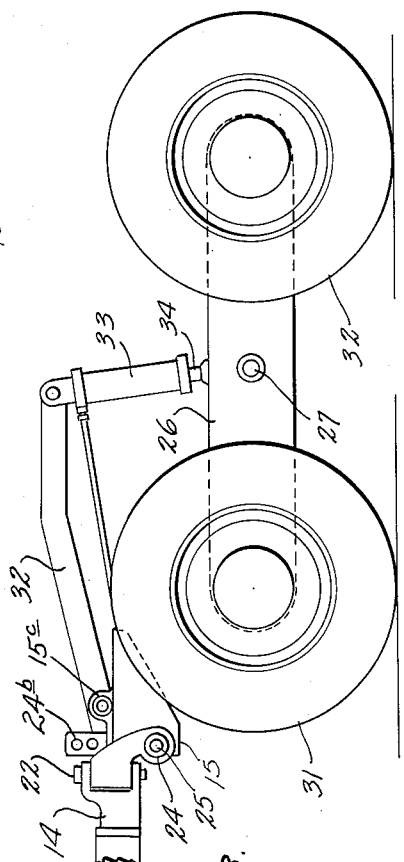
INVENTOR.
HERMAN C. ERLING,
BY
McMorrow, Berman + Davidson
ATTORNEYS.

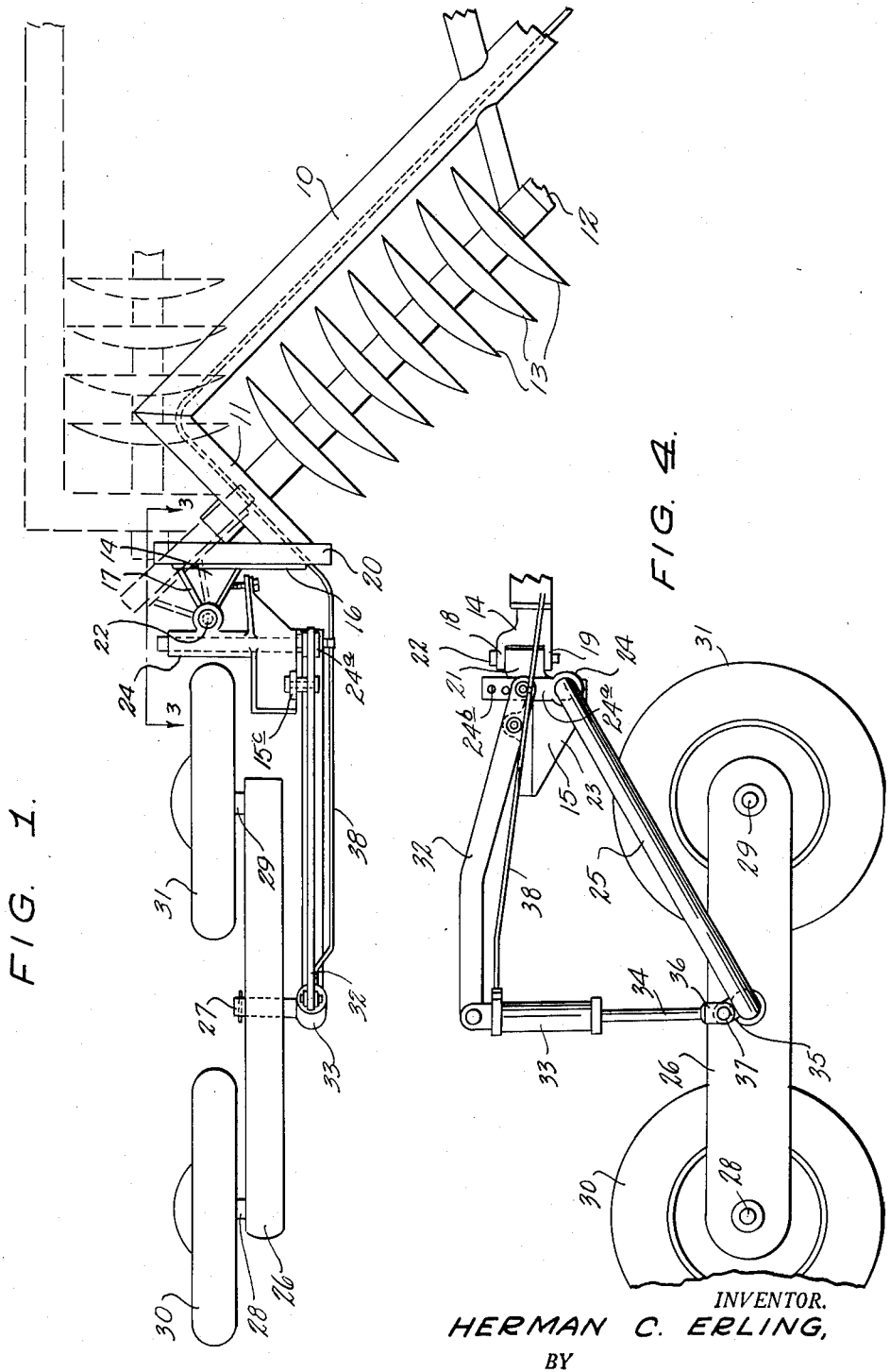

ns and the plant growth through which the plow operates, # United States Patent Office 2,734,437
Patented Feb. 14, 1956

2,734,437

CARRIAGE LIFT FOR DISC PLOWS

Herman C. Erling, Bismarck, N. Dak.

Application February 14, 1950, Serial No. 144,137

1 Claim. (Cl. 97—46.59)

This invention relates to a stabilizer for a plow and more particularly to a trailing stabilizer for a one way disc plow.

It is among the objects of the invention to provide a trailing stabilizer for a disc plow which stabilizer can be easily attached to the frame of an existing plow with no material modification of the plow frame construction to trail the plow in the plow furrow, which has sufficient weight to stabilize the rear end of the plow and constrain the plow to follow the furrow and operate uniformly at the operating depth for which the plow is set regardless of variations in the physical characteristics of the soil and the plant growth through which the plow operates, which is effective to support the rear end of the plow at selected elevations for plowing and at a higher elevation for movement of the plow to and from an operational area, which follows unevenness in the land, curving furrows and turning movements of the plow and its towing tractor without diminution of its stabiling effect on the plow, and which is simple and durable in construction, economical to manufacture, and easy to install and use.

Other objects and advantages will become apparent from a consideration of the following description and the appended claim in conjunction with the accompanying drawings wherein:

Figure 1 is a top plan view of a plow stabilizer illustrative of the invention and a fragmentary portion of a plow to which the stabilizer is attached;

Figure 2 is a side elevation of the stabilizer and plow fragment illustrated in Figure 1;

Figure 3 is a side elevation of the stabilizer looking at the opposite side of the stabilizer from that illustrated in Figure 2; and Figure 4 is a side elevation of the stabilizer similar to Figure 2 but showing the movable parts in a different operative position from that illustrated in Figure 2.

With continued reference to the drawings, the portion of the plow illustrated comprises a tubular frame including a side portion 10 and a rear end portion 11 extending from the rear end of the side portion to one side of the latter and substantially perpendicular to the side portion, a shaft 12 disposed below and rotatably connected to the frame and a gang of spaced apart, sequentially arranged plow discs 13 mounted on the shaft 12.

As the plow may be of well known construction, a more detailed description thereof is considered unnecessary for the purposes of the present disclosure.

The plow stabilizer of the present invention includes a coupling bracket 14 and a lift connected to the coupling bracket 14 by a hinge connection. The bracket 14 comprises a flat base structure 16, a ribbed formation 17 projecting from one side of the base structure 16 and two spaced apart, apertured lugs 18 and 19 extending from the end of the projection 17 opposite the base structure 16. This bracket is secured to the rear end of the plow frame by means of a bar 20 which is welded or otherwise suitably secured to the rear frame member 11 and extends at an angle to this rear frame member such that it is disposed substantially perpendicular to the path of travel of the plow.

The lift 15 has an apertured sleeve portion 21 received between the lugs 18 and 19 and a hinge pin 22 extends through the lugs 18 and 19 and the bearing sleeve formation 21 to constitute with the lugs and bearing sleeve formation the hinge connection between the bracket 14 and lift 15. The bracket 14 is attached to the plow frame so that the axis of this hinge connection is substantially vertical.

The lift 15 has a substantially horizontal surface extending rearwardly from the bearing sleeve 21 intermediate the height of the bearing sleeve and has a front edge depending vertically from the bearing sleeve, these two edges being connected by a triangular plate or web formation 23.

The lift 15 includes a bearing sleeve 24 positioned along the front edge of this lift and extending substantially at right angles to the bearing sleeve formation 21 and normally disposed somewhat below the latter. A link rod 25 has at one end an end portion disposed at right angles to the intermediate portion of the rod and rotatably received in the bearing sleeve 24 and carried by and projecting upwardly from the rod 25 adjacent the lift bracket 15 is a post 24a having a row of vertically spaced openings 24b extending therethrough. An ear 15c is carried by the lift bracket 15 and projects upwardly therefrom in spaced relation to the post 24a.

An elongated, weighted beam 26 is provided substantially at its mid-length location with a transverse aperture and the link rod 25 has a perpendicularly disposed portion 27 at its opposite end rotatably received in the aperture in the beam 26. Axles 28 and 29 are secured to the beam 26, one near each end of the beam and project laterally from the same side of the beam. A wheel 30 is journaled on the axle 28 and a similar wheel 31 is journaled on the axle 29, these two wheels having substantially a common plane of rotation and defining with the beam a weighted carriage.

The beam 26 is held by the link rod 25 so that the longitudinal center line of the beam is substantially parallel to the path of travel of the plow and the wheels 30 and 31 are so positioned relative to the plow frame that they both travel, one behind the other, in the furrow at the rear of the plow. Both of these wheels are equipped with rubber tires so that, when the rear end of the plow is supported in elevated position on the stabilizer it can be moved over a paved road, if desired.

An arm 32 is pivotally connected at one end to the post 24a and intermediate its ends to the ear 15c and extends rearwardly above the link rod 25 and has its rear end positioned substantially vertically above the end portion 27 of the link rod. It will thus be seen that as the arm 32 moves about its pivotal connection to the post 24a, the lift bracket 15 will be moved to a selected height above the beam 26. The cylinder 33 of an expansible chamber hydraulic device is pivotally connected at one end to the rear end of the arm 32 and depends from this arm while the piston rod 34 of the hydraulic device is pivotally connected at its outer end to the beam 26 by suitable means, such as the apertured lug 35, which extends outwardly from the intermediate portion of the link rod 25 at the end of this intermediate portion joined to the end portion 27 and is received within a fork 36 secured on the outer or lower end of the piston rod 34 and connected to the fork by a pivot pin 37.

A fluid line 38 leads from the cylinder 33 forwardly along the stabilizer and the plow to a connection with a tractor operated hydraulic pump and a manually controlled valve so that the application of fluid under pressure to the hydraulic device can be manually controlled.

When hydraulic fluid under pressure has been supplied to the cylinder 33 the expansible chamber device is expanded raising the rear end of the arm 32 and consequently raising the rear end of the plow and supporting the plow in elevated position on the beam 26 and wheels 30 and 31.

The beam 26 is preferably provided as a heavy casting although it may be provided as a structural frame of suitable material, such as steel, weighted with other material, such as lead or concrete. The weight of this beam is sufficient to maintain the wheels 30 and 31 firmly in the plow furrow and to hold the plow at the desired operating depth and against any erratic movements. The pivotal connection between the beam and the link rod 25 permits the wheels 30 and 31 to move relatively up and down for rocking movement of the beam 26 as the stabilizer passes over inequalities or unevenness in the ground while the pivotal connection between the link rod and the bracket 15 permits the plow to be raised and lowered relative to the beam.

The hinge connection between the coupling brackets 14 and the lift 15 permits the stabilizer to swing relative to the plow so that it will follow the plow along a curved path and in turning of the plow, to reverse the direction of travel.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In an earth working implement of the type comprising a frame lying oblique to the direction of advance of the implement, and a row of spaced earth working blades carried by the frame and extending parallel therewith, means for gauging the depth to which the blades enter the ground during the advance of the implement when working and for elevating the blades clear of the ground when transporting the implement, said means comprising a weighted carriage adapted to move in the direction of advance of the implement behind the trailing end of the frame, a link carried by the carriage for movement in a vertical arcuate path adjacent one side thereof, a lift carried by the link for movement therewith adjacent the forward end of the carriage, said lift being operatively connected to the frame for raising or lowering it and moving the blades to a selected height relative to the ground, an arm carried by the lift and extending rearwardly therefrom above the link, and an extensible element carried by the carriage and operatively connected to the arm for moving the lift to selected heights relative to the carriage.

References Cited in the file of this patent

UNITED STATES PATENTS

| | | |
|---|---|---|
| 197,159 | Mowrey | Nov. 13, 1877 |
| 413,157 | Westervelt | Oct. 15, 1899 |
| 884,365 | Chase | Apr. 14, 1908 |
| 1,253,089 | Owens | Jan. 8, 1918 |
| 1,808,759 | Bickerton | June 9, 1931 |
| 2,314,041 | Gurries | Mar. 16, 1943 |
| 2,377,410 | Field | June 5, 1945 |
| 2,531,557 | Dayton | Nov. 28, 1950 |